Patented June 6, 1939

2,161,638

UNITED STATES PATENT OFFICE 2,161,638

AZO DYES

Swanie S. Rossander, Wilmington, Del., assignor to E. I. du Pont de Nemours & Company, Wilmington, Del., a corporation of Delaware No Drawing. Application July 3, 1937, Serial No. 151,963

1 Claim. (Cl. 260—178)

A. This invention relates to direct dyes for cellulose. By the term "cellulose" I mean those compounds which are indicated by the term and also regenerated celluloses.

B. It is an object of this invention to prepare new dyes which will color cellulose from an aqueous bath and which will have an increased substantivity for the fiber such that it can later be diazotized and coupled with the production of different shades having improved qualities and fastness.

C. The objects of the invention are accomplished, generally speaking, by diazotizing a compound represented by the formula:

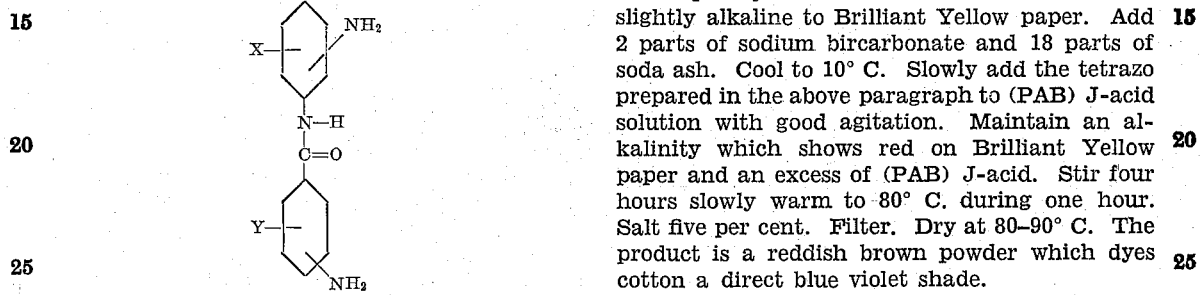

in which X is one of the group consisting of halogen and alkoxy and Y is one of the group consisting of hydrogen, alkyl, halogen, and alkoxy, and coupling it to amino-aroyl-amino-naphthol-sulfonic acid. In the formula shown in this paragraph the lower benzene nucleus may be replaced by a component having a single naphthalene nucleus.

D. The following examples describe but do not limit the process of making the compounds:

Example I

Slurry 14.4 parts of

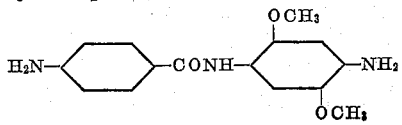

(prepared by methods well known to the art of condensing nitro-benzoyl-halide with 4-nitro-2:5-dimethoxy-aniline and subsequent reduction) with 400 parts of water. Add 25 parts of 10 normal hydrochloric acid. Stir until dissolved. Cool to 5° C. Add 50 parts of 2 normal sodium nitrite solution slowly as absorbed. Keep acid to Congo red paper and a distinct excess of nitrite at 5° C. during one-half hour.

Add 39.5 parts of para-amino-benzoyl-J-acid to 600 parts of water at 20° C. Add ammonia (approx. 9 parts of 27%) until the (PAB) J-acid is completely dissolved to a solution which is slightly alkaline to Brilliant Yellow paper. Add 2 parts of sodium bircarbonate and 18 parts of soda ash. Cool to 10° C. Slowly add the tetrazo prepared in the above paragraph to (PAB) J-acid solution with good agitation. Maintain an alkalinity which shows red on Brilliant Yellow paper and an excess of (PAB) J-acid. Stir four hours slowly warm to 80° C. during one hour. Salt five per cent. Filter. Dry at 80–90° C. The product is a reddish brown powder which dyes cotton a direct blue violet shade.

The formula of the dye is:

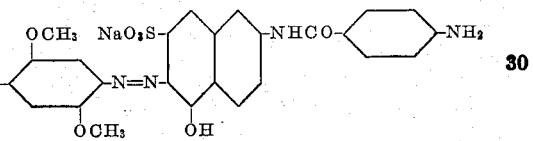

Example II

Add 13.0 parts of 1(para-amino-benzoyl-amino)-2-chlor-4-amino-benzene to 400 parts of water. Add 25 parts of 10 normal hydrochloric acid. Stir 15 minutes. Cool to 8° C. Slowly add 50 parts of normal sodium nitrite as rapidly as absorbed. Maintain acidity on Congo red paper and an excess of sodium nitrite for one-half hour at 8° C.

Dissolve 39.5 parts of para-amino-benzoyl J-acid with ammonia per directions given in Example I. Add 2 parts of sodium bicarbonate and 18 parts of sodium carbonate. Cool to 10° C. Slowly add the tetrazo of 1(para-amino-benzoyl-amino)-2-chlor-4-amino-benzene to the (PAB) J-acid solution with good agitation. Keep an excess of (PAB) J-acid and strong alkalinity on Brilliant red paper. Stir four hours. Slowly warm to 80° C. Add five percent salt and filter. Dry at 80–90° C. The dry powder is red. It dyes cellulose a red shade.

The formula of the dye is:

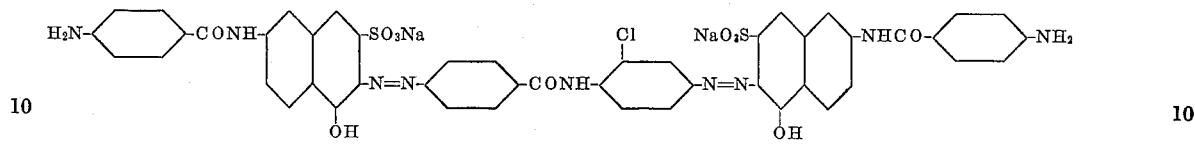

E. In the following table (PAB) means para-amino-benzoyl and (MAB) means meta-amino-benzoyl:

| Ex. | Tetrazo component | Coupling component (2 mole) | Shade on cellulose |
|---|---|---|---|
| 3 | 1-(PAB amino)-2-chlor-4-amino-benzene | (PAB J-acid)₂ | Red. |
| 4 | ----do---- | (MAB J-acid)₂ | Do. |
| 5 | 1-(PAB amino)-2:5-dimethoxy-4-amino-benzene | (PAB J-acid)₂ | Brown. |
| 6 | ----do---- | (MAB J-acid)₂ | Do. |
| 7 | 1-(MAB amino)-2:5-dimethoxy-4-amino-benzene | (PAB J-acid)₂ | Do. |
| 8 | ----do---- | (MAB J-acid)₂ | Do. |
| 9 | 1-(PAB amino)-2-methoxy-5-methyl-4-amino-benzene | (PAB J-acid)₂ | Do. |
| 10 | ----do---- | (MAB J-acid)₂ | Do. |
| 11 | 1-(PAB amino)-4-amino-benzene-2-sulfonic acid | (PAB J-acid)₂ | Orange. |
| 12 | 1-(PAB amino)-5-amino-benzene-2-sulfonic acid | ----do---- | Do. |
| 13 | 1-(PAB amino)-2-methoxy-4-amino-benzene | (PAB J-acid)₂ | Red orange. |
| 14 | ----do---- | (MAB J-acid)₂ | Do. |
| 15 | 1-(PAB amino)-2-methoxy-5-amino-benzene | (PAB J-acid)₂ | Do. |
| 16 | ----do---- | (MAB J-acid)₂ | Do. |
| 17 | 1-(PAB amino)-4-amino-naphthalene | (PAB J-acid)₂ | Red. |
| 18 | ----do---- | (MAB J-aid)₂ | Do. |
| 19 | 1-(PAB amino)-4-amino-benzene-2-sulfonic acid | ----do---- | Orange. |
| 20 | 1-(PAB amino)-5-amino-benzene-2-sulfonic acid | (MAB J-acid)₂ | Do. |
| 21 | 1-(PAB amino)-2-amino-naphthalene | (PAB J-acid)₂ | Red. |
| 22 | ----do---- | (MAB J-acid)₂ | Do. |
| 23 | 1-(PAB amino)-2:5-dimethoxy-4-amino-benzene | (PAB Gamma-acid)₂ | Violet. |

F. The aroyl grouping may be benzene or naphthalene either of which may be further substituted by radicals such as halogen, alkoxy, alkyl, and alphyl. The arylene diamine may be a naphthyl derivative which may or may not be further substituted by groups such as halogen, alkoxy, alkyl, alphyl, alkoxy halogen, hydroxy-acetic, and dimethoxy.

G. The coupling components of the examples are described as N(amino-aroyl)-amino-naphthol sulfonic acids in which amino-aroyl was para-amino-benzoyl and meta-amino-benzoyl, and the amino-naphthol-sulfonic acids consisted of 2-amino-5-naphthol-7-sulfonic acid or 2-amino-8-naphthol-6-sulfonic acid. As amino-aroyl there may also be used amino-naphthoyl and ortho-amino-benzoyl. As the amino-naphthol-sulfonic acid there may also be used its isomeric products, and poly sulfonic acids, such as 1-amino-8-naphthol-3:6-disulfonic acid. The coupling components may be otherwise substituted in any of the involved nuclei. However, the coupling positions in the naphthalene nuclei must not be blocked. Among the substituent groups there may be mentioned alkyl, alkoxy, hydroxy, halogen, carboxyl and sulfonic acid. In the preferred embodiments amino-aroyl is meta-amino-benzoyl or para-amino-benzoyl and the amino-naphthol sulfonic acid is 2-amino-5-naphthol-7-sulfonic acid.

H. The products of this invention are azo dyes of improved properties. The preferred products, involving N-(amino-aroyl)-2-amino-5-naphthol-7-sulfonic acid as coupling components, give developed dyeings (with beta naphthol) on cotton and regenerated cellulose that are characterized by their fastness to washing and by their excellent discharge properties.

I. In the preferred types (amino-aroyl) is (meta or para-amino-benzoyl); the amino-naphthol-sulfonic acid is the 2, 5, 7 isomer (J-acid); the preferred arylene diamines are 2:4-di-amino-anisole, 2:5-di-amino-anisole, 2:5-di-amino-1:4-dimethoxy-benzene, ortho-chloro-para-phenylene diamine.

J. As many apparently widely different embodiments of this invention may be made without departing from the spirit and scope thereof, it is to be understood that I do not limit myself to the specific embodiments thereof except as defined in the appended claim.

I claim:

A compound represented by the formula:

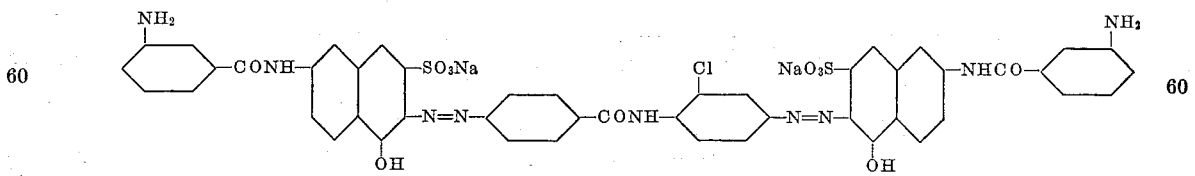

SWANIE S. ROSSANDER.